United States Patent [19]

Beimgraben

[11] 4,263,788
[45] Apr. 28, 1981

[54] UNIVERSAL JOINT APPARATUS HAVING SLIDING PLATE CONSTRUCTION FOR SEPARATING THRUST AND TORQUE FORCES

[75] Inventor: Herbert W. Beimgraben, Houston, Tex.

[73] Assignee: Baker International Corporation, Orange, Calif.

[21] Appl. No.: 23,423

[22] Filed: Mar. 23, 1979

[51] Int. Cl.³ .......................... F16D 3/02; F16D 3/16; F16D 3/50
[52] U.S. Cl. ........................................................ 64/8
[58] Field of Search ........................... 64/6, 7, 8, 17 R

[56] References Cited

U.S. PATENT DOCUMENTS

| | | | |
|---|---|---|---|
| 2,016,042 | 10/1935 | Lewis | 64/7 X |
| 3,012,420 | 12/1961 | Schaedler | 64/7 |
| 3,339,379 | 9/1967 | Snyder | 64/7 |
| 3,609,994 | 10/1971 | Collatti et al. | 64/8 |
| 3,914,959 | 10/1975 | Laksen | 64/7 |
| 3,930,378 | 1/1976 | Schmid | 64/17 R X |
| 4,026,125 | 5/1977 | Patterson | 64/8 X |
| 4,151,728 | 5/1979 | Kimball | 64/7 |

Primary Examiner—Henry K. Artis
Attorney, Agent, or Firm—William C. Norvell, Jr.

[57] ABSTRACT

A universal joint is provided for transferring thrust and torque forces from a rotatable means for driving to a rotatable means to be driven. The joint has a pair of end housings each connected to a respective rotatable means at one end thereof and having a socket formed at the other end thereof. A shaft has a socket formed at each end thereof and one shaft socket and one end socket cooperative to receive a ball. The thrust forces are transferred through abutting surfaces on the sockets and the ball. Each socket also has one end of an individual plate attached thereto. The other end of each plate is slidably received by a slot formed in the respective ball. The two slots on each ball are formed one hundred eighty degrees apart and the longitudinal axis of one of the slots is rotated ninety degrees relative to the longitudinal axis of the other one of the slots.

8 Claims, 17 Drawing Figures

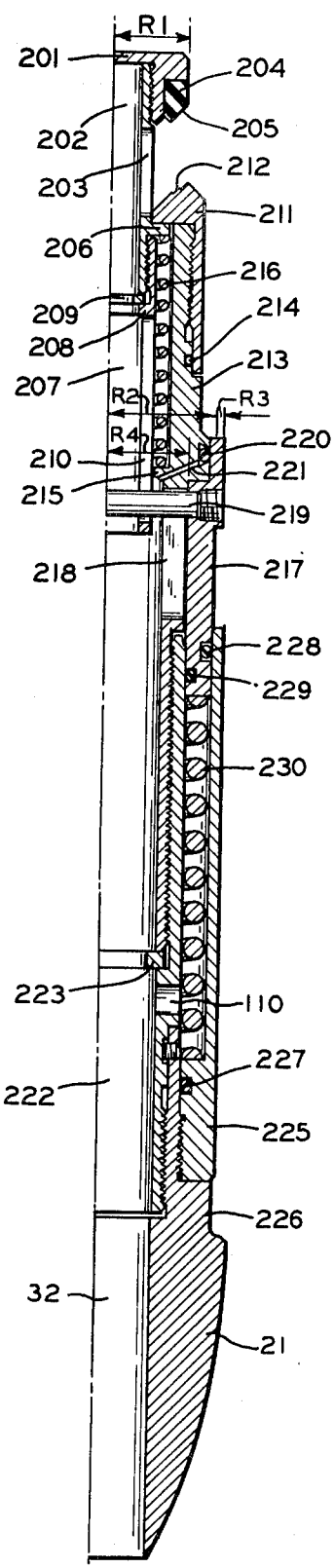
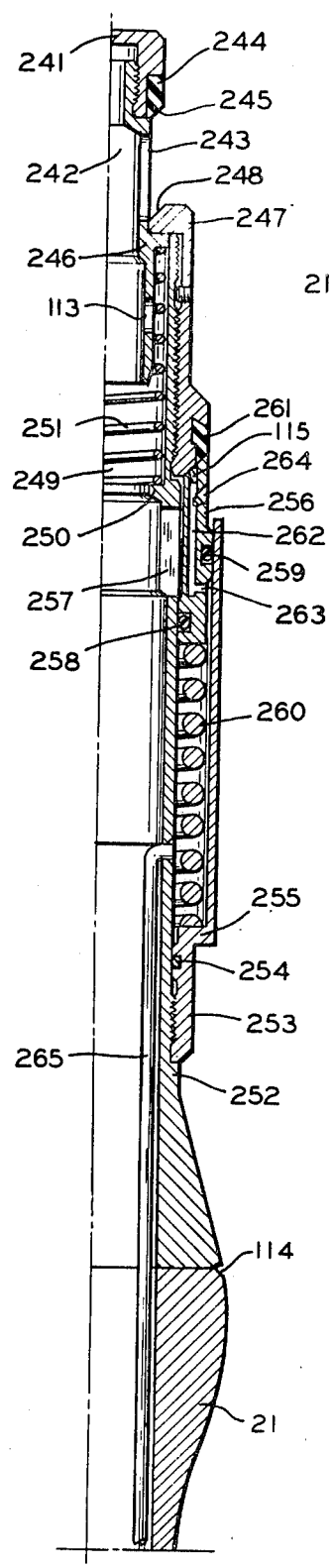
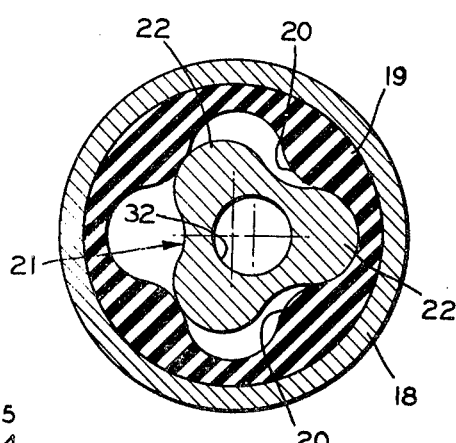
FIG. 4
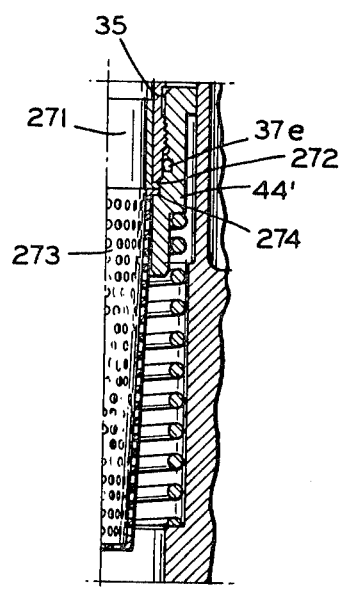
FIG. 7
FIG. 5  FIG. 6

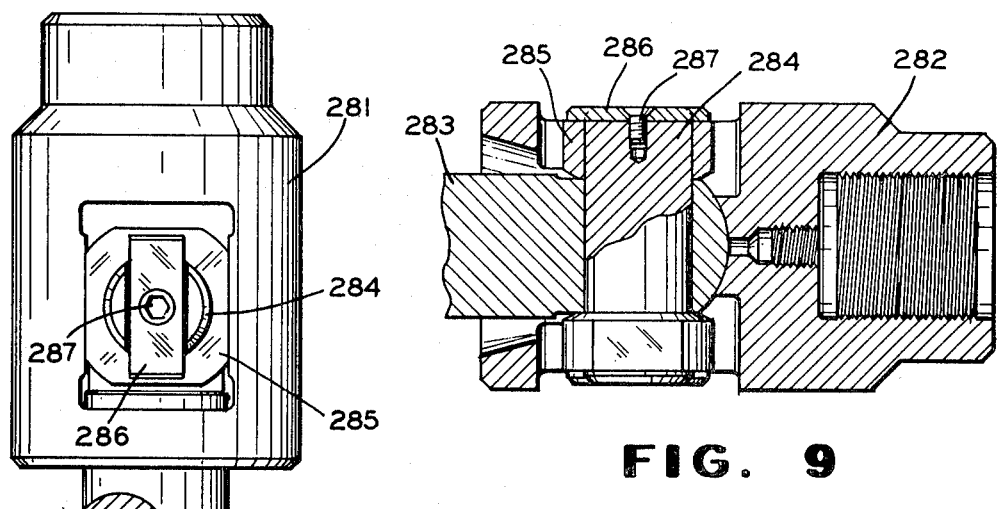
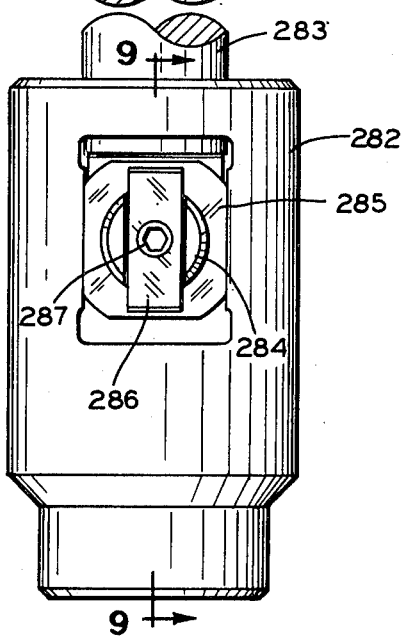
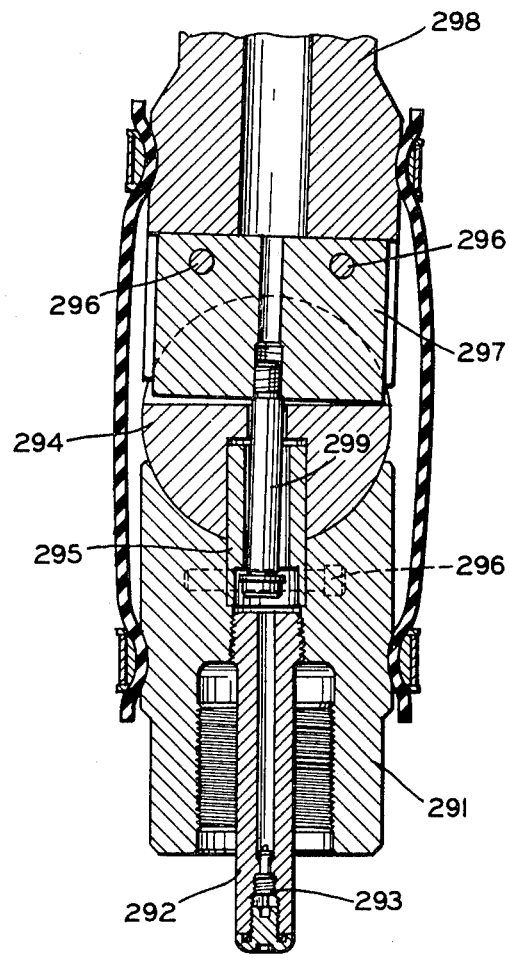
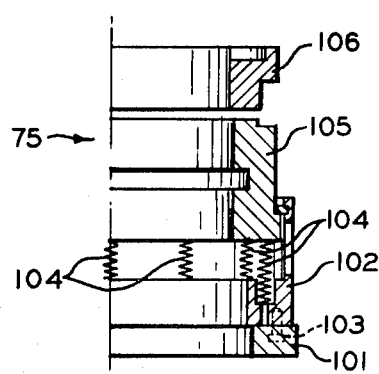

UNIVERSAL JOINT APPARATUS HAVING SLIDING PLATE CONSTRUCTION FOR SEPARATING THRUST AND TORQUE FORCES

CROSS-REFERENCE TO RELATED APPLICATIONS

This application is related in subject matter to co-pending application Ser. No. 023,202, filed Mar. 23, 1979, entitled "Fluid Pressure Actuated By-Pass And Relief Valve"; co-pending application Ser. No. 023,200, filed Mar. 23, 1979, entitled "Apparatus And Method For Closing A Failed Open Fluid Pressure Actuated Relief Valve"; co-pending application Ser. No. 023,199, filed Mar. 23, 1979, entitled "Universal Joint Apparatus For Separating Thrust And Torque Forces"; co-pending application Ser. No. 023,422, filed Mar. 23, 1979, entitled "Improvements In Fluid Sealing Of A Universal Joint For A Downhole Drilling Apparatus"; co-pending application Ser. No. 023,421, filed Mar. 23, 1979, entitled "Marine Bearing For A Downhole Drilling Apparatus"; co-pending application Ser. No. 023,420 filed Mar. 23, 1979, entitled "Metal-To-Metal Face Seal"; and co-pending application Ser. No. 023,419, filed Mar. 23, 1979, entitled "Apparatus For Applying Pressure To Fluid Seals", with each being assigned to the same assignee as this application.

BACKGROUND OF THE INVENTION

1. Field of the Invention

The present invention relates in general to universal joints and in particular to universal joints which separate the thrust and torque forces applied thereto.

2. Description of the Prior Art

Downhole drilling motors of the positive displacement type, embodying a rotor and stator arrangement of the Moineau type illustrated and described in U.S. Pat. No. 1,892,217, are well known. The rotor in prior drilling motors has one lobe operating within a companion two lobe stator made of rubber or corresponding elastomer material, the rotor itself being a solid steel member. The rotor partakes of an eccentric or orbital pass around the axis of the stator, producing an excessive amount of vibration as a result of the orbiting speed of the rotor, combined with its relatively high mass due to its solid construction, resulting in a decreased life of the rotor and of the parts of the motor associated therewith.

The drilling weight of prior motor apparatus in transmitted through a bearing assembly to the motor shaft, this bearing assembly being lubricated by the drilling mud or other fluid pumped down through the string of drill pipe and through the motor itself. Since drilling mud is very often sand laden, the bearings are operating in an abrasive liquid, resulting in their relatively short life, limiting the time that the motor can be used in drilling a bore hole, with consequent requirements for moving the entire motor apparatus from the bore hole and replacement of a substantial number of its parts, or, for that matter, replacement of the entire motor unit. Because of the use of the solid rotor, a dump valve assembly is incorporated in the drilling string above the motor to allow the drilling fluid to fill the drill pipe as the apparatus is run in the bore hole and to drain from the drill pipe while coming out of the hole.

The use of a single lobe rotor results in the rotor, drive shaft and bit connected thereto operating at a relatively high speed, the motor being capable of producing a low maximum torque. Such high speed reduces considerably the drilling life of a drill bit, shortens the life of the bearings, and increases the afore-mentioned vibration difficulties. With a single lobe rotor, only a limited fluid pressure differential can be used to prevent excessive fluid slippage between the rotor and stator during orbital movement of the rotor around the stator axis with consequent reduction in the horsepower developed by the drilling motor.

U.S. Pat. No. 3,840,080 discloses a downhole drilling motor having a multiple lobe rotor operating within a companion multiple lobe stator. In a Moineau type of apparatus, the stator has one lobe more than the rotor.

With a drilling motor embodying a multiple lobe rotor, the pressure differential that can be used without an undesirable percentage of fluid slippage is far greater than with a single lobe rotor. Accordingly, for a given pressure differential, more drilling weight can be applied to the drilling bit, or conversely, a given drilling weight can be applied to the bit with a less pressure drop across the drilling motor. Since the torque developed for a given pressure is much greater than in the prior drilling motors, and since the pressure differential across the motor is greater, the combination of these factors results in the capability of the motor to generate a far greater torque than in the prior drilling motors.

By way of example, since the torque generated at any pressure differential in this apparatus is about one and three-fourths times that developed by prior devices, the motor being operable at about twice the pressure differential of the prior devices, the motor is capable of generating at least three and one-half times the torque of the prior devices. Accordingly, while drilling, this apparatus has the capability of operating with about three and one-half times as much drilling weight imposed on the drill bit.

Furthermore, the motor is capable of generating at least three and one-half times the torque of the prior devices. Accordingly, while drilling, this apparatus has the capability of operating with about three and one-half times as much drilling weight imposed on the drill bit.

Furthermore, the motor can develop the proper horsepower while operating at much slower speeds than prior fluid motors, permitting roller type drilling bits to be used without increased damage to their parts, so that the drilling bit is capable of drilling greater footages before requiring withdrawal from the bore hole and replacement. The result is a considerable saving in drilling cost per foot of hole, a lesser number of drilling bits being required for drilling a required length of bore hole, which is produced at greater drilling rates. Moreover, there is a substantial reduction in the time required for making round trips of the apparatus into and out of the bore hole for the purpose of changing drilling bits.

The vibration of the rotor is considerably reduced by making it hollow, which reduces its mass, thereby contributing to long life of the motor and of the parts associated therewith. The vibration is also reduced by the ability to operate the drilling motor at reduced r.p.m.

Because of the use of a hollow rotor, with the advantages noted above, a dump valve assembly can be incorporated in the rotor itself, which is closed while drilling fluid is being pumped down through the drillng string and the drilling motor. The valve automatically opens to permit the drilling mud or other fluid to drain from the drill pipe, through the hollow rotor, motor shaft and bit while the apparatus is being removed from a bore hole filled with drilling mud or other fluid, the string of drill pipe automatically filling with the drilling mud or other fluid in the bore hole while the drill pipe and apparatus are being run in the bore hole.

The apparatus is provided with a bearing assembly in the drilling motor that is sealed against entry of external fluids and substances, such as the drilling mud. The bearing assembly is filled with oil maintained at a higher pressure than the pressure externally of the bearing assembly, thereby insuring clean oil acting upon the bearings themselves which contributes to the long life of the bearing assembly, enhancing its ability to transmit drilling weight from the drilling string and stator or housing portion secured thereto and to the drill bit, as well as its ability to resist radial or lateral motion of the motor shaft within the stator or housing.

The apparatus also provides a bearing assembly in a fluid drilling motor which is capable of safely transmitting greater drilling weights from the drill string and stator or housing to the drill bit. More particularly, a plurality of thrust bearings are used in which one of the bearings normally carries the weight being imposed on the drill bit up to a predetermined amount, an additional bearing being brought into operation to transmit drilling weight to be imposed on the bit in excess of the predetermined amount.

SUMMARY OF THE INVENTION

The present invention concerns a universal joint apparatus for transferring thrust and torque forces from a rotatable means for driving to a rotatable means to be driven. Such a universal joint is especially suited for connecting a fluid actuated rotor to a drive shaft attached to a bit in a downhole drilling apparatus.

A pair of end housings each have one end thereof connected to a respective one of the rotatable means and a socket formed in the other end thereof. A shaft has a socket formed in either end thereof, each socket cooperating with a respective one of the end housing sockets to receive one of a pair of balls.

Each of the end housing and shaft sockets has one end of an individual plate attached thereto. The other end of each plate is slidably received by a slot formed in the respective ball. The thrust forces are transferred through the balls and sockets and the torque forces are transferred through the plates and balls.

The two slots in each ball are formed one hundred eighty degrees apart on the exterior surface of the ball. The longitudinal axis of one of the slots is rotated ninety degrees with respect to the longitudinal axis of the other slot.

BRIEF DESCRIPTION OF THE DRAWINGS

FIG. 4 is a cross-sectional view taken along the line 4—4 of FIG. 1.

FIG. 5 is an enlarged quarter sectional view of an alternate embodiment of the valve assembly shown in FIG. 2a having the by-pass and relief functions separated.

FIG. 6 is an enlarged quarter sectional view of another alternate embodiment of the valve assembly shown in FIG. 2a having the by-pass and relief functions separated.

FIG. 7 is an enlarged fragmentary quarter sectional view of a modification to the valve assembly of FIG. 2a.

FIG. 8 is an enlarged top plan view of an alternate embodiment of the universal joint subassembly shown in FIG. 2c.

FIG. 9 is a cross-sectional view taken along the line 9—9 of FIG. 8.

FIG. 10 is a fragmentary cross-sectional view of a second alternate embodiment of the universal joint subassembly shown in FIG. 2c.

FIG. 11 is an enlarged fragmentary quarter sectional view of the seal subassembly of FIG. 2e.

DESCRIPTION OF THE PREFERRED EMBODIMENTS

Figure 1:
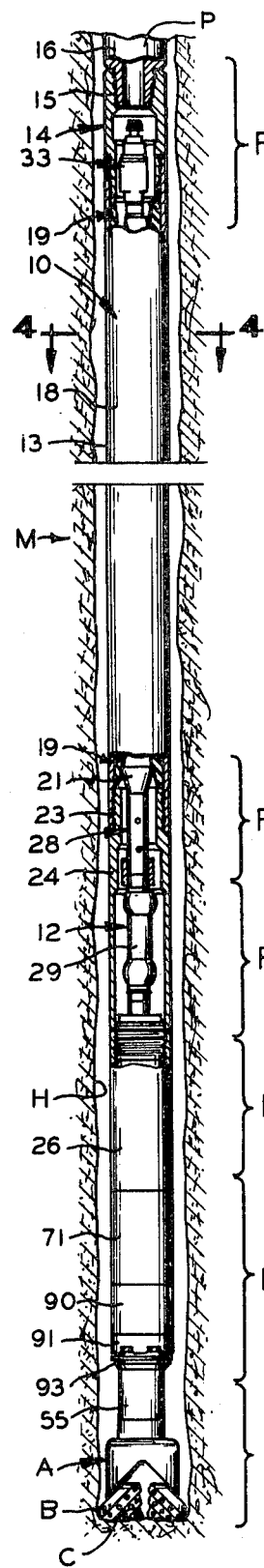
FIG. 1 is a side elevational view of a hydraulic downhole drilling motor secured to a string of drill pipe and a drill bit in a bore hole.
Figure 3A:
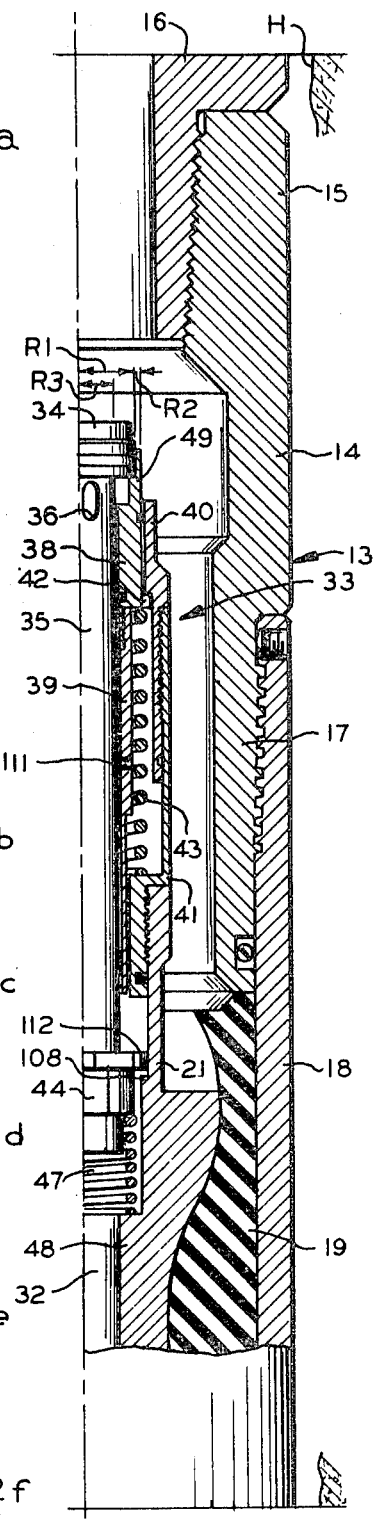
FIGS. 3a and 3b are enlarged fragmentary quarter sectional views of the valve assembly of FIG. 2a in the closed and relief positions respectively.
Figure 3B:
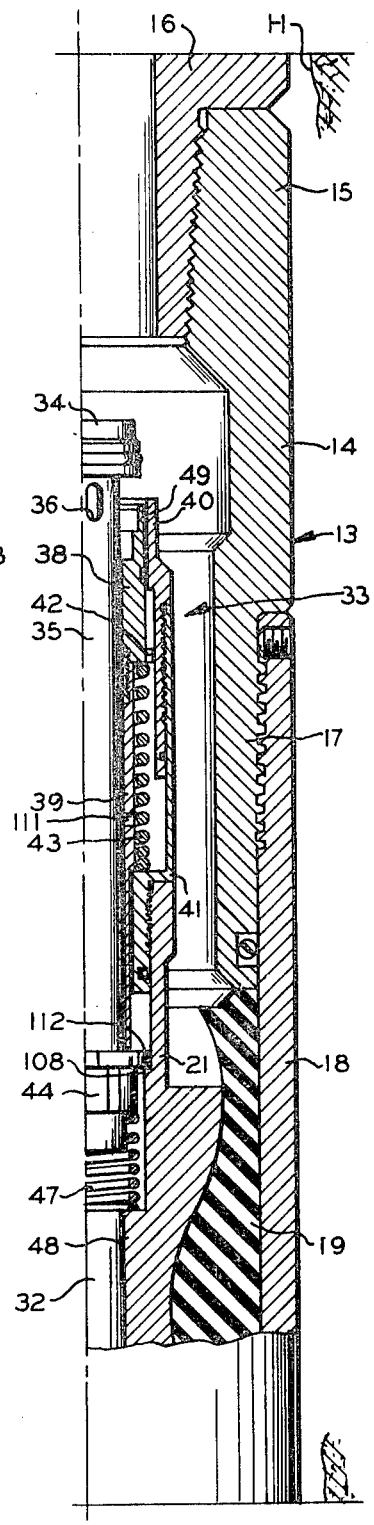

A hydraulic downhole drilling motor M is illustrated in the drawings, the upper portion of which is connected to a tubular string P, such as a string of drill pipe extending to the top of a bore hole H, such as an oil or gas well being drilled, and the lower end of which is secured to a suitable rotary drill bit A having cutters B for operating upon the bottom C of the bore hole. The drilling motor includes an upper hydraulic motor portion 10 and a lower drive shaft portion 11 connected to the rotary drill bit, a universal joint assembly 12 being disposed between the upper and lower portions. As disclosed, and now referring to FIGS. 1 and 2a, an outer housing structure 13 is provided, including an upper sub 14 having a threaded box 15 threadedly secured to a lower pin 16 of an adjacent drill pipe section P, this sub having a lower pin 17 threadedly secured to an outer stator housing 18. The stator housing has mounted therein an elongate elastomer rubber or rubber-like stator 19 having steeply pitched helical lobes or threads 20 coacting with an elongate metallic hollow rotor 21 having steeply pitched helical lobes or threads 22 companion to the stator lobes. Details of the stator and rotor lobes and their coaction are unnecessary to an understanding of the present invention, since they are described in U.S. Pat. No. 1,892,217. The number of stator lobes 20 is one more than the number of rotor lobes 22.

Now referring to FIGS. 2b, 2c, 2d and 2e, a lower threaded box 23 of the stator housing 18 is threadedly secured to the upper end of an intermediate housing portion 24, a lower box end 25 of which is threadedly secured to a lower housing portion or section 26. Thus, the outer housing structure 13 comprises the upper sub 14, the outer stator housing 18, the intermediate housing portion 24, the lower housing portion 26 and the bearing housing 71. The portions 26 and 71 enclose a bearing assembly 27 extending between the motor shaft 11, and the housings 26 and 71, and which have the purpose of resisting radial movement of the drive shaft within the housing structure, and for transmitting drilling weight from the string of drill pipe P through the housing structure 13 to the drill bit A, to force the cutters B against the bottom C of the bore hole (as shown in FIG. 1).

The hollow rotor 21 terminates in a tubular extension 28 secured to the upper end of a universal joint subassembly 29. The extension 28 has side ports 30 in fluid communication between a central passage 31 in the extension and the interior of the intermediate or universal housing 24. The central passage 31 communicates with the internal passage 32 in the rotor 21 extending to the upper end thereof. The passage 32 is capped by a by-pass and relief valve assembly 33.

The valve 33 is utilized to fill and drain the drill pipe during lowering and lifting respectively. However, the valve 33 also actuates at a predetermined fluid pressure to allow fluid to flow through the interior of the rotor 21 to prevent over-torqueing of the motor during drilling operations. The valve will open at the predetermined fluid pressure and close at a lower predetermined fluid pressure to prevent chattering. Such operation is accomplished by increasing the area upon which the fluid pressure acts when the relief valve opens.

When lowering or lifting the drill pipe, there is no fluid being pumped into the drill pipe. Therefore, the valve 33 is in its normally open position to allow fluid in the well or in the drill pipe to by-pass through the rotor 21. When drilling begins, the fluid pressure closes the valve 33 and the fluid is forced between the rotor 21 and the stator 19. When the fluid pressure exceeds the predetermined fluid pressure, the relief portion of the valve is actuated and the fluid again will by-pass the motor to prevent damage thereto.

Figure 2A:
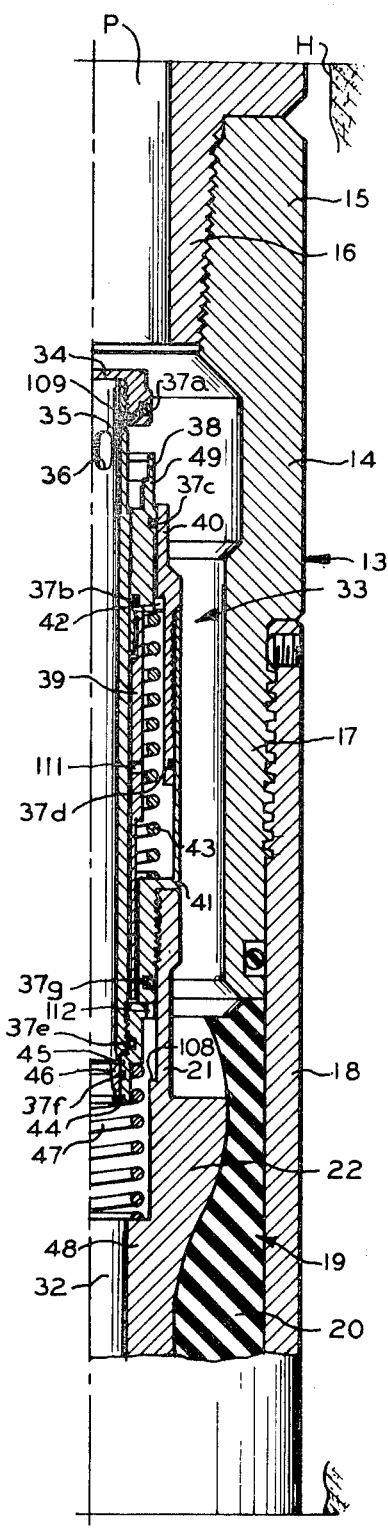
FIGS. 2a, 2b, 2c, 2d, 2e and 2f are enlarged quarter sectional views in side elevation of the drilling apparatus of FIG. 1.

As shown in FIG. 2a, a sliding sleeve cap 34 is threadedly secured to the upper end of a hollow mandrel 35 having openings 36 formed in the side wall thereof and in fluid communication with the hollow interior of the upper sub 14. The cap 34 has a radial groove formed in the exterior thereof for retaining an O-ring 37a or other type of seal. An orifice 109 is formed in the cap 34 for fluid communication between the groove for the O-ring 37a and the lower end of the cap 34. This is a low pressure area that assists in maintaining the seal 37a in its groove. The mandrel 35 is movable longitudinally in a sliding sleeve 38 and a sliding sleeve extension 39. The sleeve 38 has a radial groove formed in the interior wall thereof for retaining an O-ring 37b which sealingly engages the exterior surface of the mandrel 35. The lower end of the sleeve 38 is reduced in diameter and has threads formed thereon for engaging threads formed on the inner surface of the upper end of the extension 39. An orifice 111 is formed in the side wall of the extension 39 and slots are formed in retainer 44 to allow fluid communication between the spring cavity, described below, and the interior of the rotor 21 below the orifice 46.

The mandrel 35, the sleeve 38 and the sleeve extension 39 are also movable longitudinally in a sliding sleeve housing 40 and a compressed spring housing 41. The sleeve 38 has a radial groove formed in the exterior wall thereof for retaining an O-ring 37c which sealingly engages the interior wall of the housing 40. The housing 40 has an internal flange which engages a stop 42 formed on the exterior surface of the sleeve 38. The lower end of the sleeve housing 40 has external threads formed thereon for engaging internal threads formed on the upper end of the spring housing 41. A radial groove is formed in the exterior wall at the extreme lower end of the sleeve housing 40 for retaining an O-ring 37d which sealingly engages the interior wall of the spring housing 41.

The spring housing 41 has a reduced diameter lower end which forms the upper end of a flange. Thus, the sleeve 38, the sleeve extension 39, the sleeve housing 40 and the spring housing 41 form a cavity for retaining a helical relief valve spring 43. The upper end of the spring 43 abuts the lower surface of the larger diameter portion of the sleeve 38 and the lower end abuts the upper surface of the flange of the spring housing 41. The spring 43 exerts pressure tending to force the stop 42 against the internal flange of the sleeve housing 40.

The lower end of the spring housing 41 abuts the upper end of an orifice retainer 44. The retainer 44 has threads formed on the interior wall thereof for engaging threads formed on the exterior wall of the lower end of the mandrel 35. The retainer 44 also has a first radial groove formed in the interior wall thereof for retaining an O-ring 37e which sealingly engages the end portion of the exterior wall of the mandrel 35 below the threads. The retainer 44 is stepped intermediate its ends to form an internal flange which abuts the lower end surface of the mandrel 35. The lower portion of the retainer 44 has a second radial groove formed in the interior wall thereof to receive the outer portion of a snap ring 45. The lower end of the retainer 44 has an inwardly facing radial flange formed thereon, this flange and the snap ring 45 cooperating to retain a replaceable tubular orifice 46 therebetween. The retainer 44 has a third radial groove formed in the interior wall thereof intermediate the lower end flange and the snap ring groove for retaining an O-ring 37f which sealingly engages the exterior wall of the tubular orifice 46.

The lower end of the spring housing 41 has threads formed on the external wall thereof for engaging like threads formed on the internal wall of the upper end of the rotor 21. Thus, the upper end wall of the rotor 21 abuts the lower wall of the flange between the upper and lower portions of the spring housing 41. The extreme lower end of the spring housing 41 has a radial groove formed in the outside wall thereof for retaining an O-ring 37g which sealingly engages the interior wall of the rotor 21. A helical compression spring 47 has its upper end abutting the exterior step in the retainer 44 and its lower end bearing against an internal shoulder 48 in the rotor 21.

OPERATION OF BY-PASS AND RELIEF VALVE ASSEMBLY

The by-pass relief valve assembly 33 is shown in FIG. 2a in the unactuated position. Referring to FIGS. 1, 2a, 3a and 3b, when fluid under pressure is introduced at the top of the pipe string P, the fluid pressure acts upon the mandrel 35, sleeve cap 34, and orifice 46. The fluid can flow around the outside of the valve 33 and through the openings 36. Thus, fluid can flow through the hollow interior of the mandrel 35 and the orifice 46 into the central passage 32 of the rotor 21. As the fluid pressure increases, the cap 34 is forced into the upper end of the sleeve 38 and the O-ring 37a seals the valve 33 against fluid flow therethrough. Further, increases in the fluid pressure force the cap 34 and the mandrel 35 downwardly compressing the spring 47 until the lower end of the cap 34 contacts an internal shoulder 49 in the sleeve 38. This prohibits further downward movement of the mandrel 35 with respect to the sleeve 38. The fluid which by-passes the valve 33 drives the rotor 21.

When the cap 34 contacts the shoulder 49, the fluid pressure first acts upon an area equal to a circle having a radius R1 plus R2, to force sleeve 38 downwardly with cap 34 and mandrel 35 with retainer 44 compressing springs 47 and 43, slightly, until the retainer 44 contacts internal shoulder 108 of rotor 21. This prevents further downward movement of the mandrel 35 with respect to the housing 40. Increasing pressure acts upon an area equal to the difference between the area of a circle having a radius of R1 plus R2 and the area of a circle having a radius R1 to force the sleeve 38 downwardly and compress the spring 43 further. Previously, the fluid pressure acting upon the exposed upper surfaces of the sleeve 38 alone was insufficient to compress the spring 43. As the sleeve 38 moves downwardly with respect to the mandrel 35 and the sleeve housing 40, the openings 36 are again exposed and a portion of the fluid flow through the valve assembly 33 to the central passage 32 in the rotor 21. Additional movement of the sleeve 38 is prevented by the extension 39 coming into contact with the shoulder of the retainer 44 that is in contact with the shoulder 108 of the rotor 21. Thus, the valve 33 functions to relieve the pressure at a predetermined motor torque to prevent damage to the drilling apparatus and the motor "stalls".

With the valve open, the fluid pressure acts upon the mandrel 35, the cap 34 and the orifice 46, holding them down. Also, with the valve open, the fluid acts upon an area equal to the difference between the area of a circle having a radius of R1 plus R2 and the area of a circle having a radius of R3, since the interior upper surfaces of the sleeve 38 are now exposed. Thus, less fluid pressure is required to hold the valve open than to open it. Also, for any flow rate, the pressure sensed by the sleeve 38 is the highest due to sensing of pressure below orifice 46. Such operation prevents chattering and alternate opening and closing, as the pressure varies about the opening pressure. There is a noticeable pressure drop when the valve remains open which can be detected at the surface to indicate to the operator that the relief valve is actuated.

In order to close the valve 33 after the motor has stalled, the drilling assembly M is lifted off the bottom C of the bore hole H. Since the motor requires very little pressure to rotate the rotor in this condition, the fluid will begin to flow past the valve to turn the rotor. As the motor comes up to operating speed, so little fluid flows through the valve that the pressure is insufficient to maintain it in the open position and the valve returns to the normal operating position shown in FIG. 3a. Also, during lowering and lifting of the drilling apparatus M, the valve 33 will automatically assume the position shown in FIG. 2a to permit fluid flow therethrough.

ALTERNATE EMBODIMENT OF BY-PASS AND RELIEF VALVE

There is shown in FIG. 5 an alternate embodiment of a by-pass and relief valve for use in a hydraulic downhold drilling apparatus. The valve is a combination poppet type by-pass valve and a separate sliding sleeve type relief valve. A sleeve cap 201 is threadably secured to the upper end of a hollow mandrel 202 having openings 203 formed in the side wall thereof and in fluid communication with the hollow interior of the upper sub 14 (not shown). The cap 201 has a reduced diameter lower portion which forms a seat for an elastomeric seal 204 having a downwardly facing sloped contact surface 205.

The mandrel 202 has a radially outwardly extending flange 206 formed below the openings 203 and is externally threaded on the lower end. A hollow mandrel extension 207 has internal threads formed in the upper end thereof for engaging the external threads of the mandrel 202. The extension 207 has a flange 208 formed below the threads whereby the lower end of the mandrel 202 and the flange 208 cooperate to trap an orifice 209 therebetween. The extension 207 also has longitudinal slots 210 formed in the side wall thereof.

A tubular sleeve housing 211 has an upper end having an upwardly facing sloped contact surface 212 with serrations formed thereon. The lower portion of the housing 211 is increased in internal diameter and has internal threads formed thereon to receive the externally threaded upper end of a tubular spring housing 213. The housing 213 has a radial groove formed on its exterior surface for retaining an O-ring 214 which sealingly engages the interior surface of the lower end of the housing 211. The housing 211 has an inwardly facing flange 215 formed thereon such that the mandrel 202, the extension 207, the sleeve housing 211 and the spring housing 213 form a cavity for retaining a helical spring 216. The upper end of the spring 216 abuts the lower surface of the flange 206 and the lower end of the spring abuts the upper surface of the flange 215 to maintain the mandrel 202 in the position shown with respect to the sleeve housing 211 and place the interior 32 of the rotor 21 in fluid communication with the upper drill pipe.

A tubular valve sleeve 217 overlaps a central portion of the sleeve housing 213 including longitudinal slots 218 formed in the side wall of the housing. A pin 219 extends radially inwardly from the side wall of the sleeve 217 through the slot 218 and the slot 210. Typically, the pin 219 extends through similar slots formed opposite the slots 218 and 210 to guide both the sleeve 217 and the extension 207 in sliding movement with respect to the spring housing 213. This pin 219 keeps the slots aligned for maximum flow when the valve is flowing, that is, when the sleeve 217 is shifted downwardly. Also, the pin 219 keeps the cap 201 in contact with the housing 211 when the valve is flowing to prevent possible chattering of this poppet.

The spring housing 213 has an external, inwardly expanding radial groove formed in the side wall thereof for retaining an O-ring 220 or other type of seal which sealingly engages the interior side wall at the upper end of the sleeve 217. An orifice 221 is formed in the side wall of the housing 213 for fluid communication between the groove for the O-ring 220 and the interior of the housing 213 above the slot 218. This is an area of low pressure that helps keep the seal 220 in the groove.

The lower end of the spring housing 213 is reduced in diameter and has threads formed on the external side wall thereof. These threads engage threads formed in the interior side wall of the upper end of a second tubular sleeve housing 222. The lower end of the housing 222 is of smaller internal diameter to form a shoulder which traps an orifice 223 against the lower end of the spring housing 213. The lower end of the housing 222 has threads formed on the exterior side wall thereof for engaging threads formed on the interior side wall of the upper end of the rotor 21. Additionally, the lower end of the housing 222 has an orifice 110 formed in the side wall to allow fluid communication between the interior of the housing 222 and the spring cavity, described below.

The rotor 21 has threads formed on the exterior upper side wall thereof for engaging threads formed on the interior lower end side wall of a second tubular spring housing 225. The rotor 21 has a radially extending flange 226 formed on the exterior side wall thereof, the lower end of the housing 225 abutting the upper face of the flange 226. The housing 225 has a radial groove formed in the interior side wall thereof above the threads for retaining an O-ring 227 which sealingly engages the exterior side wall of the upper end of the rotor 21. The center and upper portions of the housing 225 are of increased internal diameter. The lower end of the sleeve 217 has a radial groove formed in the exterior side wall thereof for retaining an O-ring 228 which sealingly engages the interior side wall of the upper end of the housing 225. A second radial groove is formed in the interior side wall of the lower end of the sleeve 217 for retaining an O-ring 229 which sealingly engages the exterior side wall of the upper end of the housing 222. The sleeve 217, the sleeve housing 222, the rotor 21 and the spring housing 225 form a cavity for a helical spring 230. The upper end of the spring 230 abuts the lower end of the sleeve 217 and the lower end of the spring abuts the shoulder formed at the lower end of the housing 225. Thus, the valve sleeve 217 can slide between the opposing faces of the housing 222 and the housing 225 from the position shown, downwardly until the pin 219 contacts the bottom of the slot 210 under the influence of the spring 230. This, of course, assumes that the slot 210 is already shifted to its downward-most position and not as shown in FIG. 5.

OPERATION OF ALTERNATIVE BY-PASS AND RELIEF VALVE

In operation and during lifting and lowering, the valve is in the position shown to permit fluid flow between the interior 32 of the rotor 21 and the upper drill pipe (not shown) through the openings 203 and the interior of the valve. When pressurized fluid is pumped down the well, the cap 201, the mandrel 202, orifice 209 and the extension 207 will be force downwardly against the spring 216 with respect to the housing 211 until the surfaces 205 and 212 are in contact to seal the interior of the valve from the pressurized fluid. Now the fluid by-passes the valve to drive the rotor 21 for drilling. The fluid pressure acts over an area approximately equal to the area of a circle with the radius R1.

The relief portion of the valve functions when the fluid pressure acting over the area equal to the difference in areas of a circle having a radius R2 plus R3 and a circle having a radius R2 is sufficient to overcome the spring 230. Then, the sleeve 217 moves downwardly with respect to the housing 213 to expose the slot 218 to the fluid flow. Fluid flows through the interior of the valve to reduce the pressure acting upon the rotor 21.

As with the previous embodiment, the present relief valve requires less pressure to maintain it open than to open it. In the open position, the fluid pressure acts over an area equal to the difference in areas of a circle having a radius R2 plus R3 and a circle having a radius R4. Also, the sleeve 217 senses the highest pressure drop due to fluid communication from below the orifice 223. Thus, the valve will not chatter. Furthermore, the by-pass and the relief functions are isolated from one another in contrast with the valve shown in FIG. 2a.

SECOND ALTERNATE BY-PASS AND RELIEF VALVE

There is shown in FIG. 6 a second alternate embodiment of the by-pass and relief valve. The valve is a combination poppet type by-pass valve and a poppet type relief valve. The relief valve is of the full-open type wherein flow through the sliding sleeve creates a pressure differential which overcomes a spring tending to close the valve.

A sleeve cap 241 is threadably secured to the upper end of a hollow mandrel 242 having an opening 243 formed in the side wall thereof. The cap 241 has a reduced diameter lower portion which forms a seat for an elastomeric seal 244 having a downwardly facing sloped contact surface 245.

The mandrel 242 has a radially outwardly extending flange 246 formed below the opening 243. A tubular sleeve housing 247 has an upper end having an upwardly facing sloped contact surface 248 formed thereon. The central and lower portions of the housing 247 have an increased interior diameter and are internally threaded for engaging threads formed on the exterior side wall at the upper end of a tubular spring housing 249. The housing 249 has a radially extending internal flange 250 formed thereon. The mandrel 242 and the housing 249 form a cavity for a helical spring 251. The upper end of the spring 251 abuts the lower surface of the flange 246 and the lower end of the spring abuts the upper surface of the flange 250. The mandrel 242 has an opening 113 formed in the side wall to allow fluid communication between the interior of the mandrel 242 and the spring cavity.

The housing 249 has an upwardly facing external shoulder 252 formed near the lower end thereof and threads formed on the exterior side wall above the shoulder. The threads engage internal threads formed proximate the lower end of a spring housing 253 which abuts the flange 252. The spring housing has a radial groove formed in the interior side wall above the threads for retaining an O-ring 254 which sealingly engages the exterior side wall of the housing 249. The central and upper portions of the housing 253 are radially outwardly offset from the lower portion to form an internal shoulder 255.

A sliding sleeve 256 is positioned between the interior wall of the housing 253 and the exterior wall of the housing 249 adjacent an opening 257 formed in the side wall of the housing 249. A radial groove is formed in the interior lower side wall of the sleeve 256 for retaining an O-ring 258 which sealingly engages the exterior side wall of the housing 249 below the opening 257. Another radial groove is formed in the increased diameter central exterior side wall of the sleeve 256 for retaining an O-ring 259 which sealingly engages the upper interior side wall of the housing 253.

The housing 249, the housing 253 and the sleeve 256 form a cavity for retaining a helical spring 260. The upper end of the spring 260 abuts the lower end of the sleeve 256 and the lower end of the spring abuts the upper face of the shoulder 255. The spring 260 forces the upper sloped end of the sleeve 256 into sealing contact with an elastomeric seal 261 retained in the lower end of the housing 247.

The central wall of housing 249 has an opening formed to which is sealingly secured a sensing tube 265, either by welding or other appropriate means, that runs inside the rotor 21 to the lower end thereof (not shown).

The housing 249 is sealingly secured to rotor 21 by welding or other appropriate means.

The sleeve 256 has a pluggable port 264 that allows communication with the passage 262, plugged at its upper end with a plug 115 through passage 263 into a spring cavity formed around the spring 260 and through the tube 265 that allows purging of this system with grease or other suitable fluid and also to fill cavities and passages with same. This assures proper sensing of pressure from the lower rotor 21 (not shown) to the under-side of the sleeve 256 for proper valve operation, to be described below.

The poppet type by-pass valve functions similarly to the valve shown in FIG. 5. Fluid pressure acting over the surface area of the top of the cap 241 and through the mandrel 242 forces the cap and the mandrel 242 downwardly against the spring 251. When the surfaces 245 and 248 sealingly engage, no fluid will flow through the valve.

Although not shown in the drawings, the by-pass portion of the valve shown in FIG. 2a could be a poppet type valve. Furthermore, various seal configurations could be utilized with the poppet type valves shown to increase the effectiveness of the seal in the by-pass valve.

There is shown in FIG. 7, a fragmentary quarter sectional view of a modification to the valve shown in FIG. 2a. If the by-pass valve or relief valve fails in the open mode, most of the pressurized fluid will flow through the center of the rotor and the motor will not drill. In this case, the drilling apparatus must be pulled from the well and repaired. The present invention solves this problem by installing a screen on the end of the sliding mandrel. The screen is then plugged by adding suitable material from above. Now the fluid pressure will build up and either force the valve closed or by the mere fact that it is plugged will cause the fluid to flow around the valve 33, and start the motor.

The screen 273 is carefully perforated so that it will catch the suitable material that must be small enough to pass through the motor and the bit without plugging. Additionally, the perforations of the screen 273 must be large enough to pass normal lost circulation material. Also, the screen 273 has the advantage of working with material that is small enough not to plug other equipment above the tool. For example, in a typical operation, ¼-inch diameter plugging material (or screen) will be satisfactory.

A modified orifice retainer 44' is threadably attached to the lower end of the mandrel 35. The retainer 44 of FIG. 2a has been modified by enlarging the groove for the snap ring 45, eliminating the groove for the O-ring 37f and eliminating the internal flange at the lower end. A replaceable tubular orifice 271 has a radially outwardly extending flange 272 formed at the lower end thereof. The orifice 271 extends into the mandrel 35 and the flange 272 abuts the lower end of the mandrel. A tubular screen 273 has a flange 274 formed at the upper end thereof and a closed bottom end. The screen 273 is positioned below the orifice 271 with the flanges 272 and 274 abutting and the retainer 44' is threaded onto the end of the mandrel 35 to retain the orifice and the screen. The screen can be plugged with small chips of rubber or any other suitable material of a size which will allow it to pass through the opening in the valve but not the openings in the screen.

UNIVERSAL JOINT

Figure 2B:
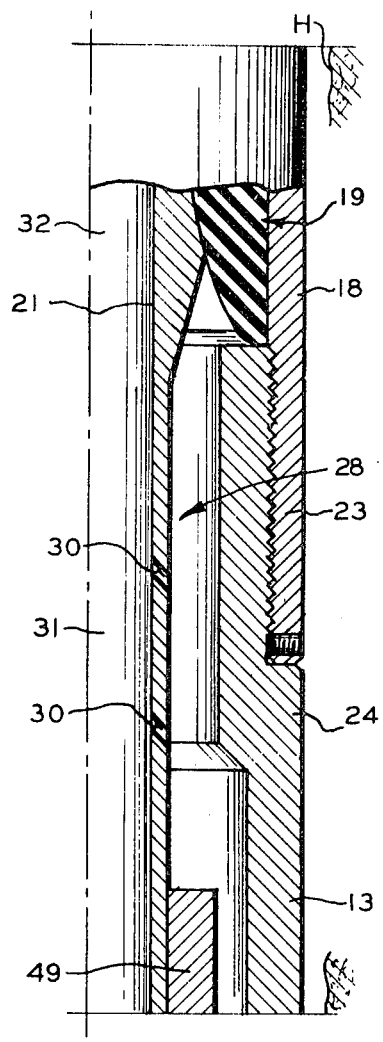
Figure 2C:
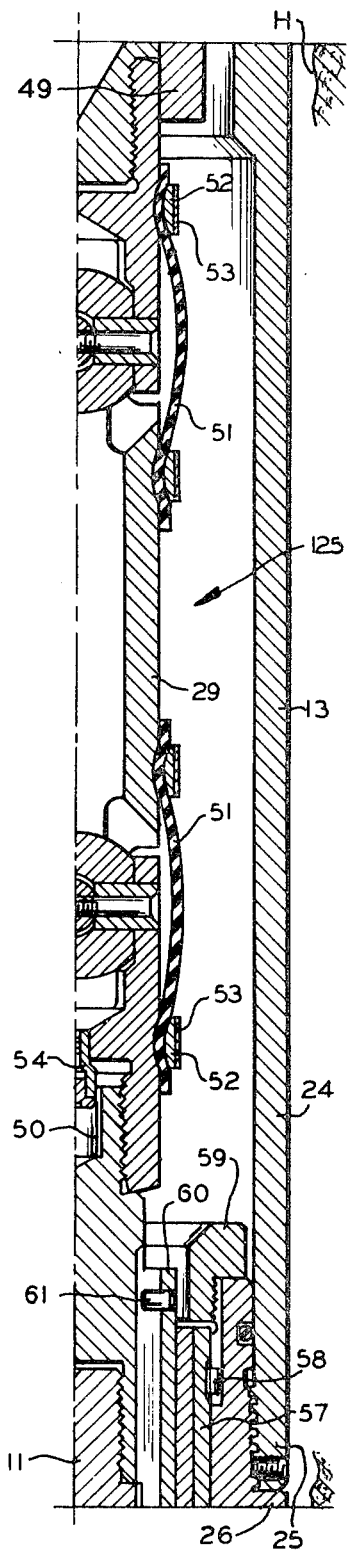

As shown in FIGS. 1 and 2b, the lower end of the rotor extension 28 is threaded into a recess (not shown) in the upper end of the universal joint subassembly 29 which is shown in more detail in FIG. 2c. A tubular pipe protector 49 is placed over the junction of the extension 28 and the universal joint 29. As the rotor 21 rotates, the protector 49 rubs against the interior of the housing 24 providing stabilization for the lower end of the rotor. This relieves the radial load on the universal joint and protects the stator 19 from high side loads.

The universal joint subassembly 29 includes a commercially available double universal joint. The joint subassembly 29 includes two universal joints with an upper end of the subassembly threadedly attached to the rotor extension 28 and a lower end threadedly attached to the upper end of a drive shaft extension 50 of the drive shaft 11. Since the rotor 21 moves in an eccentric or orbital path around the longitudinal axis of the stator 19 during its rotation, the subassembly 29 transmits such motion to the motor drive shaft 11. Each of the joints is enclosed by an elastic cover 51 secured at either end by a clamp to prevent drilling mud or other fluids flowing through the housing 24 from entering the universal joint structure and adversely affecting the universal joints.

Each clamp comprises a C-ring 52 that is compressed with a strap clamp 53 to squeeze the cover into an arcuate groove formed in the exterior of the subassembly. In this manner, a predetermined force can be exerted and there are no sharp edges to cut the cover. The drive shaft extension 50 is threaded into a recess in the lower end of the subassembly 29. A check valve 54 is threaded through the bottom wall of the lower end recess to communicate with the hollow interior of the universal joint subassembly. Oil or grease can be forced into the subassembly through the valve 54 to slightly "balloon" the covers 51. Under the hydrostatic conditions at the bottom of the well, any air trapped in the lubricant will tend to compress, but the excess lubricant will prevent the covers from coming into contact with the moving parts of the joint, thus, extending the life of the covers.

ALTERNATE UNIVERSAL JOINT

There is shown in FIG. 8 an alternate embodiment of the universal joint subassembly of FIG. 2c. It differs in that it carries the thrust through a ball and socket joint and the torque by a single large pin that rotates inside a slider. Since the thrust and torque loads are separated, it is stronger than a conventional universal joint of the same size.

The alternate universal joint subassembly includes an upper end housing 281 having a threaded recess for engaging the rotor extension 28 (not shown) and a lower end housing 282 having a threaded recess for engaging the drive shaft extension 50. Each end housing has a socket formed therein for receiving a ball formed on the end of a shaft 283. Each ball has a pin 284 inserted therethrough, the ends of the pin extending into apertures formed in the walls of the socket. A slider 285 is fitted over each end of each pin and held in place by a rectangular washer 286 and a screw 287. A pair of parallel faces of the slider 285 slidingly abut a pair of facing surfaces of the aperture which are generally parallel to the longitudinal axis of the shaft 283.

As shown in FIG. 9, the thrust forces, which are in a longitudinal direction, are carried by the abutting surfaces of the ball and the socket. The pin 284 is press-fitted into the ball. Therefore, the pin 284, the washer 286 and the screw 287 rotate relative to the slider 285. The torque, which rotates about the longitudinal axis, is carried by abutting faces of the sliders and the apertures through the ball and the pin.

Each ball and socket area, or the universal as a whole, is covered by an elastomeric seal (not shown) in a manner similar to the universal joint subassembly 29, as illustrated in FIG. 2c.

SECOND ALTERNATE UNIVERSAL JOINT

There is shown in FIG. 10 a fragmentary cross-sectional view of an alternate embodiment of the universal joint subassembly 29 of FIG. 2c. This subassembly has a lower end housing 291 having a threaded recess for receiving the drive shaft extension (not shown). A lubrication tube 292 is threaded into the bottom wall of the recess for communication with the socket formed in the end housing 291. The other end of the tube 292 threadably receives a lubrication check valve 293, such as a Schrader valve. A ball 294 has a pair of slots formed therein which are 180° apart and rotated 90° with respect to each other. One of the slots slidingly accepts a plate 295 which has been press-fitted into a slot formed in the wall of the socket. A pair of threaded fasteners 296 are utilized to prevent the plate from working loose.

The slot on the other side of the ball 294 slidingly accepts a plate 297 which has been press-fitted into a slot formed in a socket in the end of a shaft 298 which connects the lower end housing 291 with a similar upper end housing (not shown). A pair of threaded fasteners 296 are utilized to prevent the plate 297 from working loose. A threaded fastener 299 passes through holes in the plate 295 and the ball 294 and threadably engages the plate 297 to hold the lower end housing 291 and the shaft 298 together during assembly and prior to installation wherein compression forces will hold the subassembly together.

In operation, the thrust is carried through the ball and socket and the torque is carried through the plates. The plates 295 and 297 slide in the slots in the ball 294 as the universal joint is rotated, thereby transferring the torque from the upper end housing (not shown) to the shaft 298 and then to the lower end housing 291. Each ball and socket area is covered by an elastomeric seal in a manner similar to the universal joint subassembly 29 of FIG. 2c.

DRIVE SHAFT

There is shown in FIGS. 2c, 2d, 2e and 2f the drive shaft portion 11 of the drilling assembly. The lower end of the drive shaft 11 has a threaded box 55 formed thereon for receiving a threaded pin 56 of the drill bit A. The upper end of the drive shaft 11 is threaded into the drive shaft extension 50. A marine bearing 57 having an elastomeric inner sleeve attached to an outer rigid sleeve rests on a flange formed on the interior side wall of the upper end of the housing 26. A key 58 is retained by a slot in both the exterior side wall of the bearing 57 and the interior side wall of the housing 26 to prevent relative rotation therebetween. A bearing lock nut 59 is threadably received in the upper end of the housing 26 to retain the bearing 57.

A bearing sleeve 60 is attached to the drive shaft extension 50 in sliding contact with the marine bearing 57 and resting against the lower flange of the extension 50. A radially extending screw or pin 61 is secured in the side wall of the extension 50 for retaining bearing sleeve 60. Channels are formed in the exterior surface of the extension 50 to permit fluid flow between the extension and the bearing sleeve. However, a small amount of this fluid flows between the bearing sleeve 60 and the marine bearing 57 to lubricate the marine bearing. The marine bearing stabilizes the drive shaft 11 and absorbs radial loads transmitted from the universal joint subassembly.

The drive shaft 11 has a plurality of ports 62 formed in the side wall thereof. The exterior of the drive shaft side wall is threaded below the ports for receiving a tubular drive shaft nut 63. An internal radial groove is formed in the upper end of the nut 63 for retaining an O-ring 64 which sealingly engages the side wall of the drive shaft 11. The upper end of the nut 63 above the O-ring groove is of increased internal diameter to form a shoulder.

A tubular spring retainer 65 has an upper end proximate the lower ends of the marine bearing 57 and the sleeve 60. An external flange is formed on the upper end of the retainer 65 which has a lower face which abuts the upper end of a helical spring 66. A tubular piston sleeve 67 has internal threads formed on the upper end thereof for engaging threads formed on the exterior side wall of the retainer 65. The sleeve 67 has an increased diameter lower end which rests upon an internal radially extending flange formed on an upper stationary seal retainer 68. The housing 26, the retainer 65, the sleeve 67 and the retainer 68 form a cavity or cylinder for retaining the spring 66. A ring type piston 69 is disposed in the lower portion of the cavity for sliding movement therein and the upper surface of the piston abuts the lower end of the spring 66. The piston 69 also has an internal and an external radial groove formed therein for retaining O-rings 70 which sealingly engage the exterior side wall of the sleeve 67 and the interior side wall of the housing 26.

The lower end of the retainer 68 is supported by the upper end of a bearing housing 71 which threadedly engages the lower end of the housing 26. During assembly, the cavity below the piston 69 is filled with lubricant, typically oil, through an opening in the side wall of the housing 26 which opening is then closed with a check valve as will be discussed below. The lubricant can be drained through another opening in the housing 26 which normally is closed with a plug 72. The lubricant is inserted under pressure and tends to force the piston 69 upwardly compressing the spring 66. During normal operation, the spring 66 will maintain the lubricant under a pressure which exceeds the fluid pressure externally thereby preventing fluid from entering the bearing as will be discussed below. The location of the piston 69 in the cavity is a good indicator of the amount of oil in the bearing section, the location of which is determined by taking a pressure reading of the lubricant. Furthermore, the piston does not come into contact with the rotating parts such that a better seal is effected than in the prior art devices.

The lower end of the drive shaft nut 63 abuts the upper end of a tubular upper guide sleeve 73 which is keyed for rotation with the drive shaft 11. The sleeve 73 has an internal radial groove formed therein for retaining an O-ring 74 which sealingly engages the exterior side wall of the drive shaft 11. A seal subassembly 75 has an upper end attached to the lower end of the piston sleeve 67 and a lower end attached to the upper end of the housing 71. A central portion of the subassembly 75 is keyed to the upper guide sleeve 73 for rotation therewith. The seal subassembly will be discussed in more detail below.

The lower end of the sleeve 73 abuts the upper surface of an inner race 76 of a cylindrical roller bearing 77. The race 76 is supported by a spacer sleeve 78 which in turn is supported by a thrust bearing thrust ring 79. The bearing 77 is supported by a spacer sleeve 80 which in turn is supported by a thrust bearing spacer 81. A cylindrical roller thrust bearing 82 is retained between the ring 79 and the spacer 81.

A similar bearing assembly is positioned below the thrust ring 79 and includes a lower bearing spacer sleeve 83, a cylindrical roller thrust bearing 84, a bearing support and retainer 85, an inner race 86, a cylindrical roller bearing 87, a lower guide sleeve 88, and a seal subassembly 89. The retainer 85 has a radially outwardly extending flange formed at the upper end thereof which is supported on the upper end of a lower seal housing 90. The upper end of the housing 90 threadably engages the lower end of the bearing housing 71.

A cylindrical end cap 91 is attached to the lower end of the housing 90 by suitable threaded fasteners. A seal retainer 92 is threadably received in the upper end of the end cap 91 to retain the lower end of the seal subassembly 89. The upper end of the seal subassembly is attached to the seal housing 90 and a central portion is keyed for rotation with the sleeve 88. A drive shaft collar 93 is pinned to the threaded box 55 and is keyed to the sleeve 88.

Figure 2D:
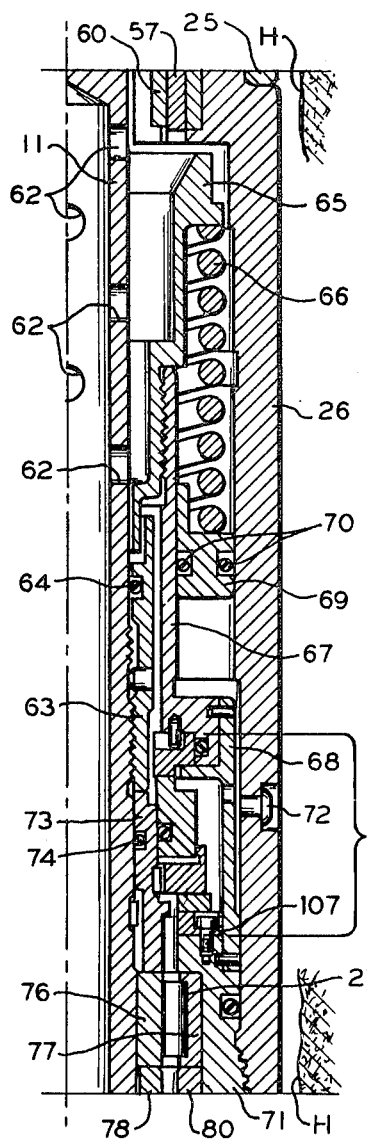
Figure 2E:
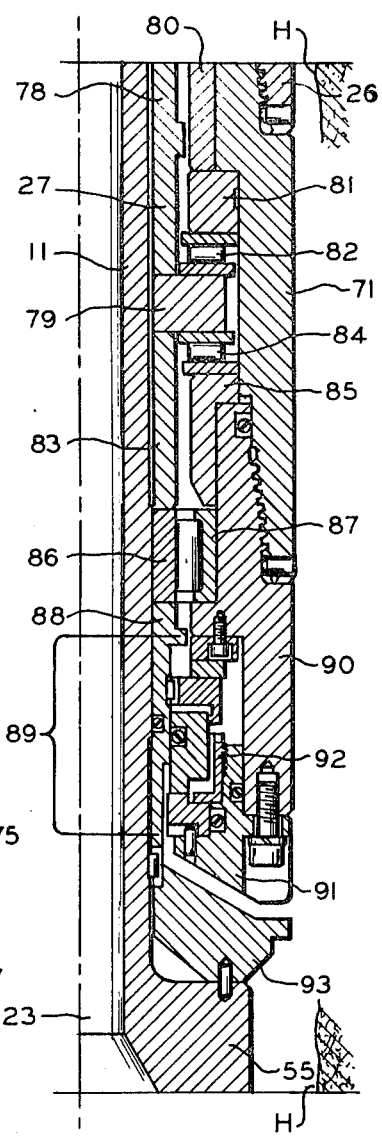
Figure 2F:
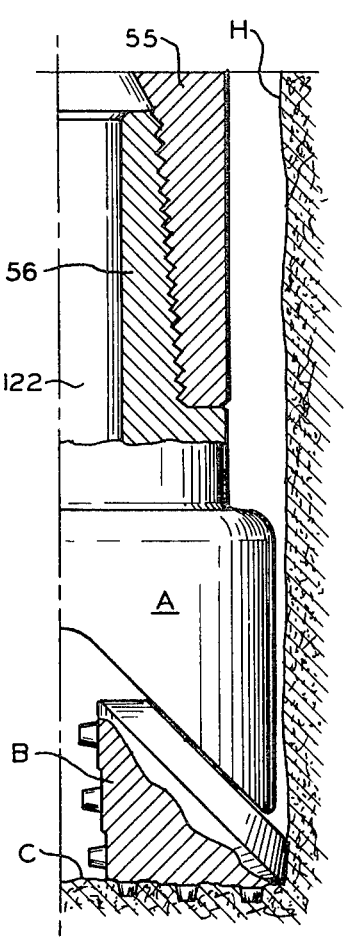

Although not shown in FIG. 2e, there is an opening formed in the side wall of the lower seal housing 90 for receiving a check valve (not shown) and a removable plug (not shown) similar to the plug 72. With the plug removed, lubricant under pressure can be forced into the interior of the bearing assembly.

The drilling mud, or other fluid external to the bearing assembly is prevented from entering by the pressurized lubricant and the seal subassemblies 75 and 89.

There is shown in FIG. 11 an enlarged quarter sectional view of the seal subassembly 75 which is similar to the seal subassembly 89. A thrust bearing washer 101 is attached to a retainer ring 102 by suitable threaded fasteners 103. The ring 102 has a plurality of apertures formed in the lower face thereof for receiving the upper ends of helical springs 104. The lower ends of the springs abut the lower surface of an upper rotating seal 105. The retainer is keyed to the upper guide sleeve 73 (FIG. 2d) for rotation with the drive shaft 11. The above-identified elements abut a stationary seal 106 which is pinned to the piston sleeve 67 (FIG. 2d).

The seals 105 and 106 are made from metal and are maintained in face-to-face contact by the springs 104 to provide sealing at very low pressure. The washer 101 rotates against a thrust bearing seat 107 such that the retainer 102 is supported by the housing rather than the drive shaft. This type of seal can accommodate radial run-out better than an elastomeric type seal and is well balanced against high pressure and reverse pressure. This seal can also accommodate axial oscillation.

OPERATION OF MOTOR

In normal use, the drill bit A is secured to the lower end of the drive shaft 11 and the upper sub 14 is secured to the lower end of the string of drill pipe P. As the drilling apparatus is lowered through the drilling fluid in the bore hole H to the bottom C thereof, the by-pass and relief valve 33 is open to permit fluid to flow upwardly through jets or nozzles (not shown) in the drill bit A. The fluid flows into a central passage 122 in the bit, through a central passage 123 in the drive shaft, out the ports 62 into the annular space above the bearings, through the marine bearing 57 and the channels in the drive shaft extension 50, and into the space 125 between the housing 24 and the universal joint subassembly 29. The fluid then enters the side ports 30 of the central passage 31 and continues up the internal passage 32 of the hollow rotor 21, through the open valve 33 and into the drill pipe P.

When the bit A reaches the bottom C of the bore hole H, drilling mud or other fluid is pumped down through the drill pipe P. At a predetermined pressure, the valve 33 closes directing the fluid to flow between the rotor 21 and the stator 19 such that the rotor rotates. The fluid follows the above-described path in the opposite direction to discharge from the bit A for cleaning the cutters and flushing the cuttings in a lateral outward direction and upwardly through the annular space between the drilling apparatus and the bore hole.

During the drilling operation, an appropriate drilling weight is imposed on the drill bit A by allowing a portion of the weight of the drill pipe P to rest upon the housing structure 13. This weight is transmitted from the upper sub 14, through the housing 18, the housing 24, the housing 26, the bearing housing 71, the thrust bearing spacer 81, the thrust bearing 82, the thrust ring 79, the spacer sleeve 83, the inner race 86, the guide sleeve 88 and the drive shaft collar 93. The weight is then transferred through the threaded box 55 to the bit A to force its cutters B against and into the bottom C of the bore hole H.

In the event that the drill bit A is lifted from the bottom C of the bore hole while fluid is being pumped through the drilling motor M, and the rotor 21, universal joint 12, drive shaft 11 and bit A are rotated, the thrust ring 79 will rest upon the lowermost axial bearing 84 to support the downward thrust imparted on the rotor by the drilling fluid exerting against the lobes 22, and the weight of the bit drive shaft 11 and the universal joint thereabove.

In summary, the present invention relates to a universal joint apparatus for transferring thrust and torque forces from a rotatable means for driving to a rotatable means to be driven. The rotatable means for driving can be a fluid actuated rotor and the rotatable means to be driven can be a drive shaft attached to a bit in a downhole drilling apparatus. The universal joint apparatus comprises a first socket means connected to one of the rotatable means; a second socket means connected to the other rotatable means; a ball received by the first and second socket means for transferring the thrust forces; and means for slidably connecting the first socket means and the ball and for slidably connecting the ball and the second socket means for transferring the torque forces.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A universal joint apparatus for transferring thrust and torque forces from a rotatable means for driving to a rotatable means to be driven comprising: first socket means connected to one of the rotatable means; second socket means connected to the other rotatable means; a ball received by said first and second socket means for transferring the thrust forces; and means for slidably connecting said first socket means and said ball and for slidably connecting said ball and said second socket means for transferring the torque forces.

2. The apparatus according to claim 1 wherein a portion of the exterior surface of said ball abuts a portion of the interior surface of each of said first and second socket means for transferring the thrust forces.

3. A universal joint apparatus for transferring thrust and torque forces from a rotatable means for driving to a rotatable means to be driven comprising: first socket means connected to one of the rotatable means; second socket means connected to the other rotatable means; a ball received by said first and second socket means for transferring the thrust forces; and means for slidably connecting said first socket means and said ball and for slidably connecting said ball and said second socket means for transferring the torque forces, wherein said means for slidably connecting includes a pair of plates, each of said plates attached at one end to a respective one of said first and second socket means; and wherein said ball has a pair of slots formed therein, each of said slots slidably receiving, the other end of a respective one of said plates for transferring the torque forces.

4. The apparatus according to claim 3 wherein said slots are formed one hundred eighty degrees apart on the surface of said ball and the longitudinal axis of one of said slots is rotated ninety degrees relative to the longitudinal axis of the other one of said slots.

5. A universal joint apparatus connected between a fluid actuated rotor and a drive shaft attached to a bit in a downhole drilling apparatus for transferring thrust and torque forces from the rotor to the drive shaft comprising: a pair of end housings each having a socket formed in one end thereof and having the other end thereof connected to a respective one of the rotor and the drive shaft; a shaft having a socket formed at either end thereof; a pair of balls each received by a cooperating one of said end housing sockets and said shaft sockets for transferring the thrust forces; and means for slidably connecting each of said end housing sockets to the respective one of said balls and for slidably connecting each of said balls to the respective one of said shaft sockets for transferring the torque forces.

6. The apparatus according to claim 5 wherein a portion of the exterior surface of each of said balls abuts a portion of the interior surface of each of the respective ones of said end housing sockets and said shaft sockets.

7. The apparatus according to claim 5 wherein said means for slidably connecting includes an individual plate having one end thereof attached to a respective one of said end housings or a respective end of said shaft; and wherein each of said balls has a pair of slots formed therein, each of said slots slidably receiving the other end of a respective one of said plates for transferring the torque forces.

8. The apparatus according to claim 7 wherein said slots in each one of said balls are formed one hundred eighty degrees apart on the exterior surface of said ball and the longitudinal axis of one of said slots is rotated ninety degrees relative to the longitudinal axis of the other one of said slots.

* * * * *